United States Patent [19]

Takahira

[11] Patent Number: 5,424,527
[45] Date of Patent: Jun. 13, 1995

[54] SIGNAL RECEIVING COIL AND NON-CONTACT TYPE IC CARD USING THE SAME

[75] Inventor: Kenichi Takahira, Itami, Japan

[73] Assignee: Mitsubishi Denki Kabushiki Kaisha, Tokyo, Japan

[21] Appl. No.: 108,222

[22] Filed: Aug. 19, 1993

[30] Foreign Application Priority Data

Aug. 21, 1992 [JP] Japan ................... 4-221862

[51] Int. Cl.$^6$ ................................ G06K 19/06
[52] U.S. Cl. ........................ 235/492; 235/493
[58] Field of Search .............. 235/492, 436, 437, 438, 235/493, 380, 449

[56] References Cited

U.S. PATENT DOCUMENTS

| | | | |
|---|---|---|---|
| 3,669,207 | 6/1972 | Fellgett et al. | 180/168 |
| 4,818,853 | 4/1989 | Ohta et al. | 235/492 |
| 5,015,834 | 5/1991 | Suzuki et al. | 235/449 X |
| 5,068,521 | 11/1991 | Yamaguchi | 235/492 |
| 5,182,442 | 1/1993 | Takahira | 235/492 |
| 5,220,158 | 6/1993 | Takahira et al. | 235/492 |
| 5,274,221 | 12/1993 | Matsubara | 235/492 |

FOREIGN PATENT DOCUMENTS

0112461 10/1983 European Pat. Off. .
0249356 5/1987 United Kingdom .

*Primary Examiner*—Donald Hajec
*Assistant Examiner*—Jeffrey R. Filipek
*Attorney, Agent, or Firm*—Leydig, Voit & Mayer

[57] ABSTRACT

A signal receiving coil in which an erroneous input of a signal due to an alternating magnetic field that has been accidentally generated is prevented. In this invention, a signal receiving coil includes a first spiral coil having a predetermined winding direction and a second spiral coil spaced from the first spiral coil. The second spiral coil is connected in series to the first spiral coil and has its winding direction opposite from that of the first spiral coil. The second spiral coil generates an induced electromotive force of substantially the same magnitude and opposite direction from the first spiral coil when both spiral coils are subjected to the same alternating magnetic field. When a change in a magnetic field is applied over the entire surface of the signal receiving coil, the induced electromotive forces generated by the two spiral coils cancel each other.

5 Claims, 9 Drawing Sheets

SIGNAL RECEIVING COIL AND NON-CONTACT TYPE IC CARD USING THE SAME

BACKGROUND OF THE INVENTION

1. Field of the Invention

The present invention relates to prevention of erroneous operation of a receiving coil, such as a reset signal receiving coil, for example, in a non-contact type IC card using electromagnetic waves for receiving and transmitting information.

2. Description of the Related Art

Among IC cards, one drawing public attention in recent years is a non-contact type IC card in which electromagnetic waves or light is used to exchange information. A block diagram of the fundamental construction of a non-contact type IC card is shown in FIG. 6. Further, FIG. 7 is a block diagram showing in more detail the circuit structure of the non-contact type IC card of FIG. 6. These figures are disclosed in Japanese Patent Publication Hei. No. 3-262089. Referring to FIG. 6, a ROM 2 and a RAM 3 are connected through a bus 8 to a CPU 1 that controls the operation of a non-contact type IC card 100. An I/O control circuit 4 for controlling input of data from and output of data to an external device 9 is connected to the bus 8, and the I/O control circuit 4 is connected to an antenna circuit 6 through a modulator-demodulator circuit 5. Further, a battery 7 for supplying power to each of the circuits is built into the card. Since the non-contact type IC card 100 operates as a computer storing a program, the CPU 1 reads the program stored in the ROM 2 or the RAM 3 to execute it.

The non-contact type IC card 100 of FIG. 7 contains an IC 10 to which the antenna circuit 6, the battery 7, and a crystal oscillator 19 are connected. The IC 10 has the CPU 1 connected to the bus 8. Connected respectively to the bus 8 are the ROM 2 for storing the program to control the operation of the CPU 1, the RAM 3 for storing data, and the I/O control circuit 4 for controlling input of data from and output of data to an external device (not shown). Further, a timer 20 for counting by dividing the frequency of an internal clock and a prescaler 21 for setting an initial value of the timer 20 are connected to the bus 8.

The I/O control circuit 4 includes a UART 22 for effecting asynchronous serial data transmission, a baud rate generator 23 for setting the transmitting rate of the UART 22, and a carrier generator 24 for generating a carrier. The modulator-demodulator circuit 5 is connected to the I/O control circuit 4, and the antenna circuit 6 is connected to the modulator-demodulator circuit 5. The modulator-demodulator circuit 5 contains a modulation circuit 25 for modulating an output of the UART 22, a demodulator circuit 26 for demodulating an input signal from the antenna circuit 6, and output transistors 27 and 28 for driving the antenna circuit 6. A reset signal for resetting the CPU 1 is received from an external device through a reset signal receiving coil 50 and is transmitted through a terminal 47 and gates 49 and 48. In addition, a clock generation circuit 29 to which the crystal oscillator 19 is connected and a monitoring timer 30 are included in the IC. A detailed description of each component in the non-contact type IC card as a whole has been disclosed in the aforementioned publication and will not be discussed here.

The actual internal structure of a conventional non-contact type IC card is shown in FIG. 8. The non-contact type IC card 100 has functional elements mounted on the front surface or on both the front and back surfaces of a circuit substrate 110, and the circuit substrate 110 is sealed in a resin. FIG. 8 shows the antenna circuit 6, the battery 7, and the reset signal receiving coil 5. The main portion of FIG. 7, except for these components, comprises the IC 10. Further, discrete resistors, discrete capacitors, etc. are provided as circuit elements in the vicinity of the IC 10. Furthermore, part of electrical connection between the respective components mounted on the front surface is effected on the back surface of the circuit substrate 110 by way of through holes.

The reset signal receiving coil is produced, for example, by winding a conductor or by forming a conductor pattern in the form of a spiral on the circuit substrate. The reset signal receiving coil 50 and a data transmitting coil forming the antenna circuit 6 in FIG. 8 are both produced in the same way, i.e., by forming a conductor pattern in the form of a spiral on the circuit substrate 110. The reset signal receiving coil 50 is connected at one end to the IC 10 through a wiring conductor on the front surface of the circuit substrate 110 and is connected at the other end to a ground by way of a through hole 60, in common with the IC 10, etc. The relation between the reset signal receiving coil 50 and the IC 10 in the non-contact type IC card of FIG. 8 is schematically shown in FIG. 9. The two ends of the reset signal receiving coil 50 are connected to the terminal 47 of the IC 10 (see FIG. 7) and to a ground, respectively.

The conventional non-contact type IC card has been constructed as described. Although a reset signal may be received by a reset signal receiving coil, it is not used in usual operation since the reset signal is provided only in limited circumstances, for example, for inspecting the card or restoring operation at the time of the occurrence of an abnormality. For this reason, the number of turns or the size of the coil is reduced to lessen its sensitivity to prevent a failure. In some cases, however, an alternating magnetic field (a magnetic field that varies with time) is accidentally applied to the reset signal coil by a strong electromagnet or the like, whereby a reset may occur relatively easily. There has thus been a problem in that an undesired reset may result.

SUMMARY OF THE INVENTION

The present invention has been made to eliminate the problem described, and it is an object of the present invention to provide a signal receiving coil that would not be erroneously operated, for example, by an accidentally generated alternating magnetic field and also to provide a non-contact type IC card that uses a signal receiving coil as a reset signal receiving coil.

In view of these objects, a signal receiving coil is provided in accordance with a first aspect of the present invention comprising a first spiral coil having a predetermined winding direction and a second spiral coil in the vicinity of, but not overlapping, the first spiral coil, the second spiral coil being connected in series to the first spiral coil and having a winding direction opposite to the first spiral coil, the second spiral coil generating an induced electromotive force of substantially the same magnitude and of the opposite direction to the electromotive force of the first spiral coil when subjected to the same alternating magnetic field.

Further, a signal receiving coil is provided in accordance with a second aspect of the present invention comprising a plurality of pairs of coils where each pair includes the first and second spiral coils as described in the first aspect of the invention and an AND circuit to which the coil pairs are connected in parallel, said AND circuit taking the logical product of the outputs of the respective coil pairs and providing it as the output signal.

Furthermore, a non-contact type IC card in accordance with a third aspect of the present invention includes a reset signal receiving coil having the construction of the signal receiving coil according to the first aspect of the invention.

Further, a non-contact type IC card in accordance with a fourth aspect of the present invention includes a plurality of pairs of coils according to the second aspect of the invention and an AND circuit to which these pairs are connected in parallel, wherein the output of the AND circuit is regarded as the received signal of a reset signal.

Further, a non-contact type IC card in accordance with a fifth aspect of the present invention includes a detachable cover sheet having a conductor film for shielding electromagnetic waves located on the card body opposite the reset signal coil.

In the signal receiving coil according to the first aspect of the present invention, two spiral coils connected in series are located close to each other and their winding directions are opposite to each other so that, when subjected to the same alternating magnetic field, they generate induced electromotive forces of substantially the same magnitude and of opposite directions. Even if an alternating magnetic field accidentally occurs, no failure will result since the electromotive forces generated on the two spiral coils cancel each other. When actually inputting a signal through the coil, alternating magnetic fields of opposite polarities are respectively applied to the two spiral coils, for example, by a signal transmitting coil having a structure similar to the receiving coil.

In a signal receiving coil according to the second aspect of the present invention, a plurality of pairs of coils, each pair having first and second spiral coils according to the first aspect of the invention, are provided. Since the logical product of the outputs of the respective coil pairs is taken, reliability is further improved.

In a non-contact type IC card according to the third aspect of the present invention, the reset signal receiving coil includes a signal receiving coil having a construction according to the first aspect of the invention. It is thus most likely to erroneously effect a reset in limited circumstances, such as in inspecting the card or restoring operation after the occurrence of an abnormality.

In a non-contact type IC card according to the fourth aspect of the present invention, a plurality of coil pairs according to the second aspect of the invention and an AND circuit to which these pairs are connected in parallel are provided. Thus, reliability is further improved with respect reset signals.

In a non-contact type IC card according to the fifth aspect of the present invention, a portion of the card body corresponding to the reset signal receiving coil is covered by a conducting film on a cover sheet. Thus, the reset signal receiving coil would not be operated by an alternating magnetic field that has accidentally been generated.

DESCRIPTION OF THE PREFERRED EMBODIMENTS

Figure 1:
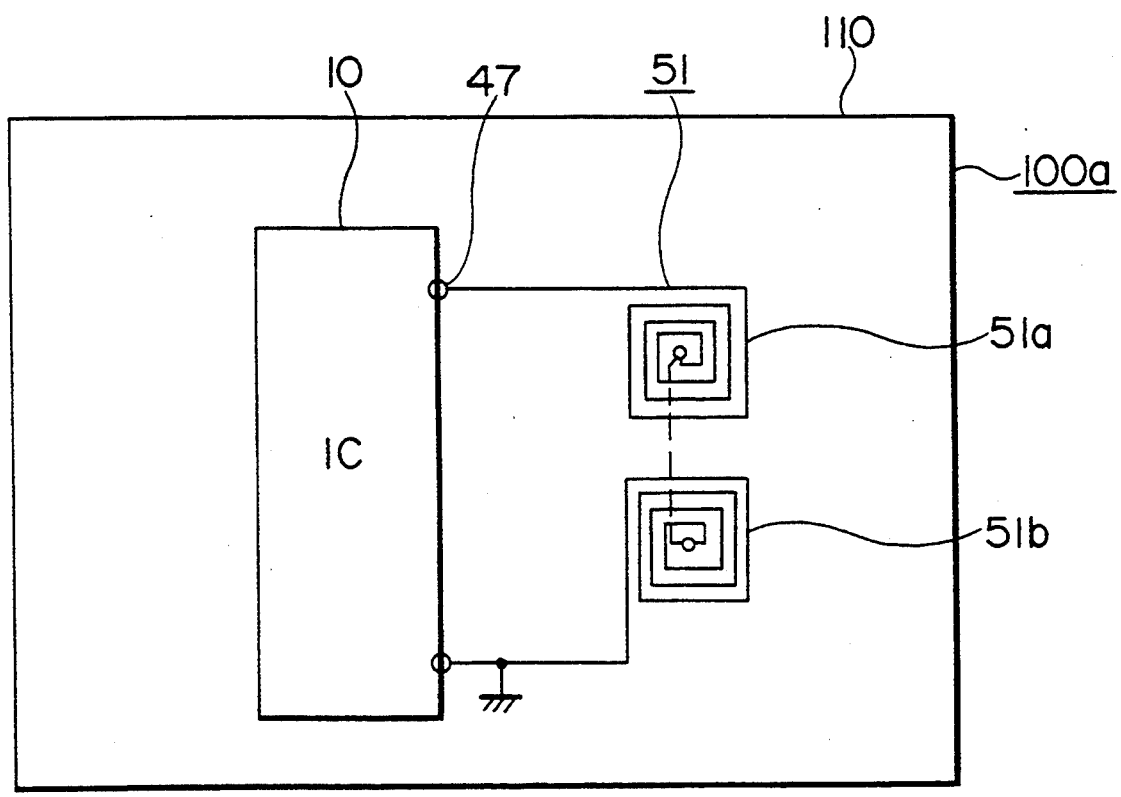
FIG. 1 schematically short the construction of a reset signal receiving coil of a non-contact type IC card according to an embodiment of the present invention.

FIG. 1 schematically shows the construction of a reset signal receiving coil of a non-contact type IC card according to an embodiment of the present invention. In this embodiment, a reset signal receiving coil 51 of a non-contact type IC card 100a is produced by forming a first spiral coil 51a and a second spiral coil 51b in proximity to each other without overlapping. In addition, these spiral coils are connected in series to each other. It is required that the first spiral coil and the second spiral coil be formed so that when subjected to the same alternating magnetic field they generate induced electromotive forces, respectively, of substantially the same magnitude and of the opposite directions from each other. For this reason, the first spiral coil 51a and the second spiral coil 51b as shown in FIG. 1 are designed such that they are identical in their shape, size, number of turns, and winding pitch while their respective winding directions are opposite from each other (i.e., the directions of current flow in the coils are opposite from each other when the coils are connected in series).

Figure 2:
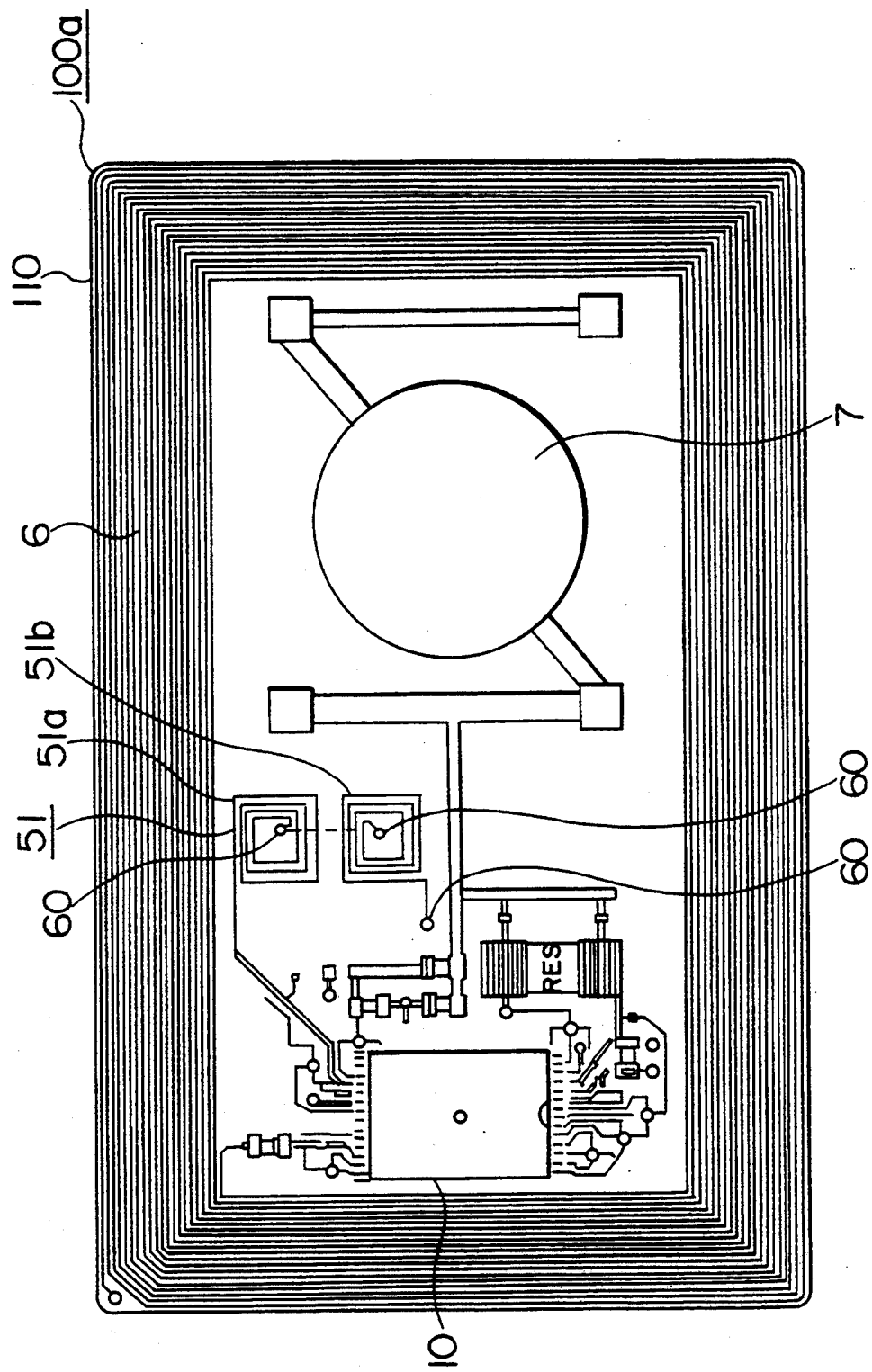
FIG. 2 is a plan view showing the internal structure of the non-contact type IC card of FIG. 1.
Figure 7:
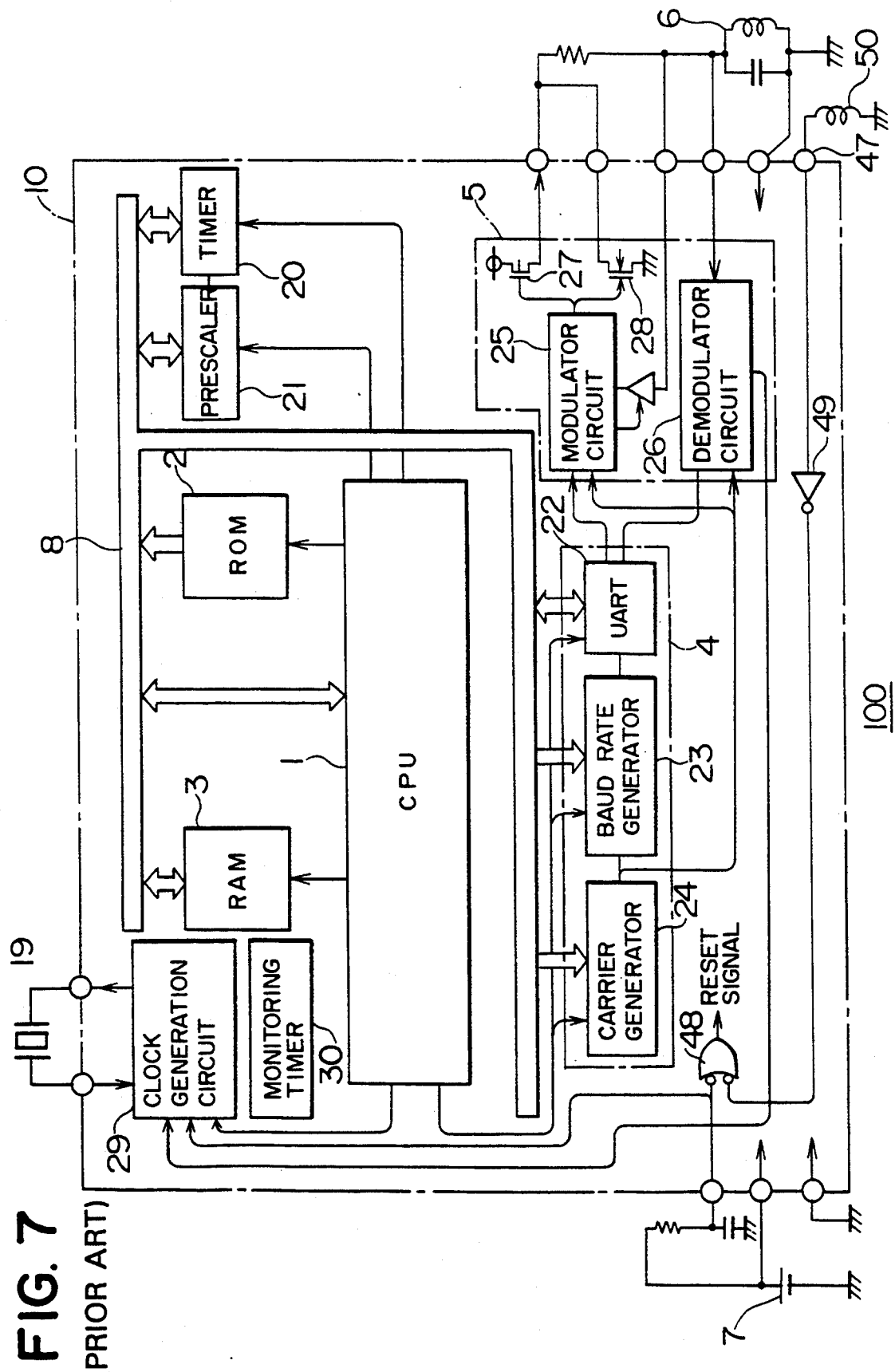
FIG. 7 is a block diagram showing the circuit construction of the non-contact type IC card of FIG. 6.

FIG. 2 is a plan view showing the internal structure of a non-contact type IC card of the present invention including a reset signal receiving coil having the construction as shown in FIG. 1. The first and second spiral coils 51a and 51b are obtained by forming spiral conductor patterns on a circuit substrate 110. The first spiral coil 51a is connected at one end to the terminal 47 of the IC 10 (see FIGS. 1 and 7) and is connected at the other end to one end of the second spiral coil 51b by way of the through hole 60 and a wiring pattern on the back side surface of the circuit substrate 110. The wiring pattern is indicated by a broken line in the figure. The other end of the second spiral coil 51b is connected by way of the through hole 60 to a ground (not shown) to which it is connected in common with the IC 10.

It should be noted that the data transmitting/receiving means as mentioned in the claims includes the antenna circuit 6, the reset signal receiving coil includes the reset signal receiving coil 51 and the circuit section includes other portions including the IC 10 and the battery 7. Further, in the actual non-contact type IC card 100a, the circuit substrate 110 as a whole having the coils and circuit parts mounted thereon is sealed, for example, in a resin in the shape of a card having smooth surfaces.

The operation of the embodiment as shown in FIGS. 1 and 2 will now be described. It is generally known from the theory of electromagnetics that a temporal change in magnetic flux causes an induced electromotive force in a closed loop located within the magnetic field. By using this fact, when the two coils 51a and 51b are first placed in the same magnetic field and the magnetic flux changes as time elapses, respective electromotive forces are induced in the coils. The absolute values of the induced electromotive forces respectively generated are substantially the same in the coils 51a and 51b since those coils are disposed close to each other on the circuit substrate 110 and they are identical in their shape, size, number of turns, and winding pitch. Since, however, the coils are wound so that the directions of the induced currents are opposite to each other, the input terminal voltage to the IC 10 is brought almost to OV when no reset signal is received. In this manner, it is possible to prevent erroneous reception of a reset signal due to a change in magnetic flux received over the entire surface of the card.

If the IC 10 is to be reset legitimately in the non-contact type IC card of the construction as shown in FIGS. 1 and 2, only one of the first and second spiral coils 51a and 51b of the reset signal receiving coil 51 is subjected to an alternating magnetic field (a magnetic field having a magnetic flux that changes as time elapses). For example, a reset signal transmitting coil (not shown) having the same dimensions as the spiral coil is accurately brought into close proximity with one of the spiral coils and an alternating current is then caused to flow. It is thereby possible to apply an induced electromotive force on only one of the spiral coils. Also, for example, a reset signal transmitting coil (not shown) in which a power supply section is connected to a coil having a similar construction to the above reset signal receiving coil 51 may be brought into close proximity with the spiral coils 51a and 51b to subject them respectively to magnetic fields that are opposite in direction.

It should be noted that, while the first spiral coil and the second spiral coil in the above described embodiment are identical in their shape, size, number of turns, and winding pitch so that induced electromotive forces of the same magnitude and of opposite directions are generated, the present invention is not so limited. The first and second spiral coils may be of different shape, size, number of turns, winding pitch, etc. They are only required to be respectively constructed so that induced electromotive forces of substantially the same magnitude and of opposite directions are generated when the coils are subjected to the same alternating magnetic field.

Figure 3:
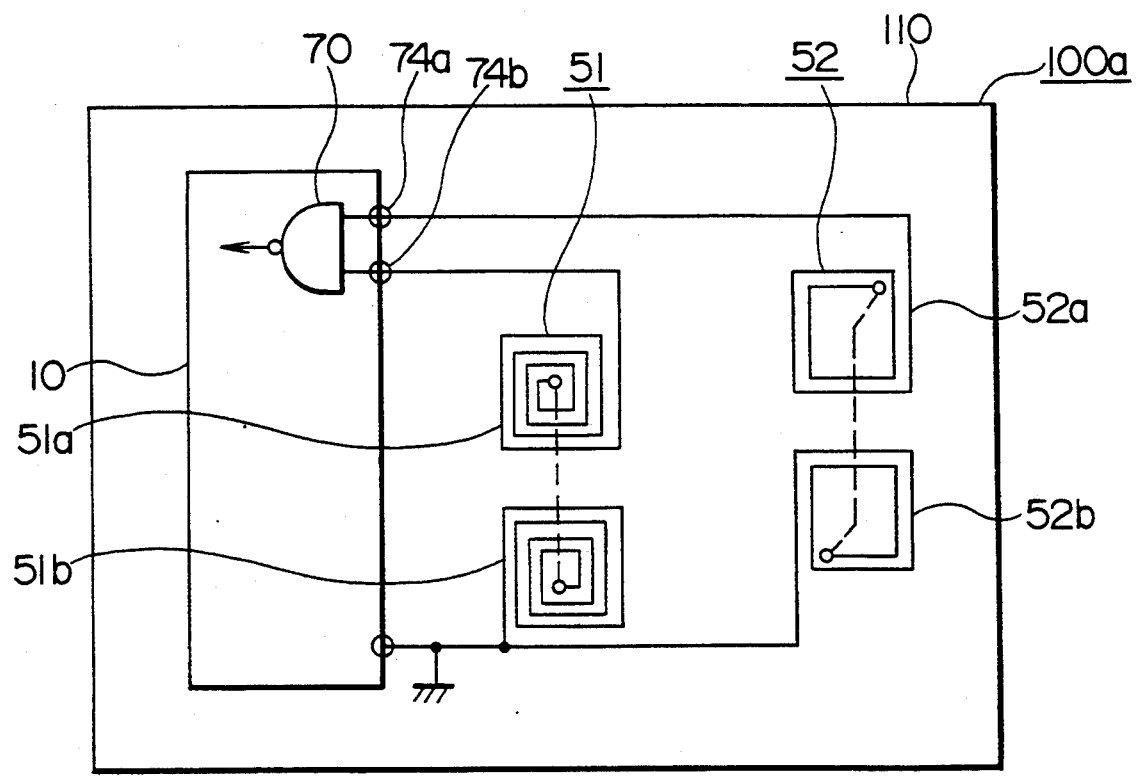
FIG. 3 schematically shows the construction of a reset signal coil of a non-contact type IC card according to another embodiment of the present invention.

FIG. 3 schematically shows the construction of a reset signal receiving coil of a non-contact type IC card according to another embodiment of the present invention. In this embodiment, two reset signal receiving coils 51 and 52, each having a construction similar to the coils in the embodiment of FIG. 1, are provided. The reset signal receiving coil 51 (paired coil) is formed by first and second spiral coils 51a and 51b, while the reset signal receiving coil 52 (paired coil) is formed by first and second spiral coils 52a and 52b. The spiral coils 51a and 51b as well as the spiral coils 52a and 52b are disposed close to each other and are identical in their shape, size, number of turns, and winding pitch. They are connected in series to each other and are wound in opposite directions so that when a current is caused to flow through them, the directions of the induced currents are opposite. Thus, in both the reset signal receiving coils 51 and 52, the first spiral coil and the second spiral coil are constructed so that induced electromotive forces of substantially the same magnitude and of opposite directions occur in the coils when they are subjected to the same alternating magnetic field. It should be noted that the respective spiral coils in the reset signal receiving coils 51 and 52 are not required to be identical in their shape, size, number of turns, and winding pitch. In addition, a NAND gate 70 is provided in the IC 10 and the outputs of the reset signal receiving coils 51 and 52 are connected to the NAND gate 70 through terminals 74a and 74b, respectively, to form an AND circuit for taking their logical product (a NAND gate is provided because the circuitry in the IC 10 is negative logic). Then, the output of the NAND gate 70 becomes the reset signal.

Figure 4:
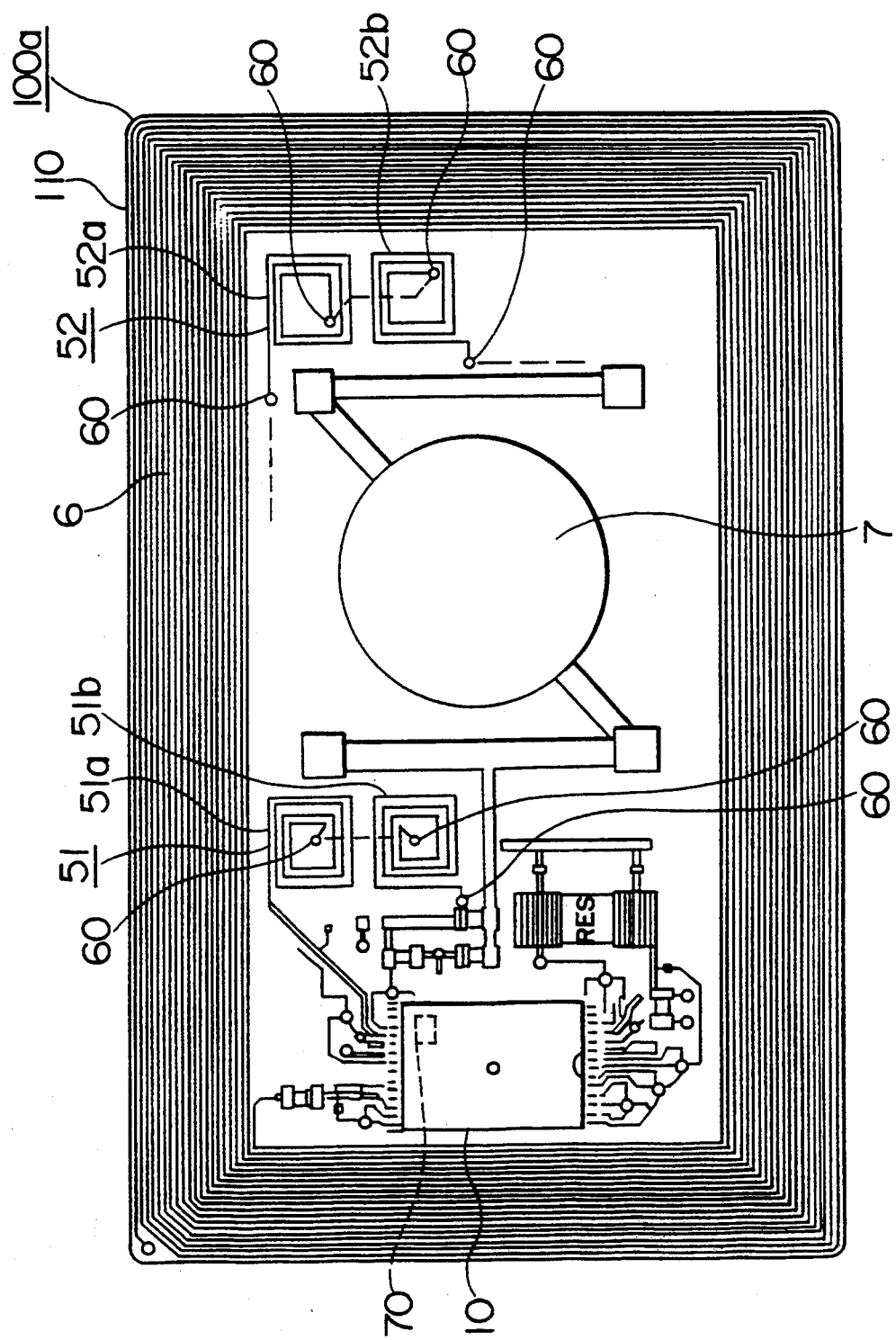
FIG. 4 is a plan view showing the internal structure of the non-contact type IC card of FIG. 3.

FIG. 4 is a plan view showing the internal structure of a non-contact type IC card according to the present invention having reset signal receiving coils of the construction shown in FIG. 3. The spiral coils 51a and 51b of the reset signal receiving coil 51 and the spiral coils 52a and 52b of the reset signal receiving coil 52 are produced by forming conductor patterns in spirals on the circuit substrate 110. In a similar manner as that shown in FIG. 2 for the reset signal receiving coil 51, the first spiral coil 51a is connected at one end to a terminal 47b (corresponding to the terminal 47 in FIG. 7) of the IC 10 and is connected at the other end to one end of the second spiral coil 51b by way of a through hole 60 and a wiring pattern on the back side surface of the circuit substrate 110. The wiring pattern is indicated by a broken line in the figure. The other end of the second spiral coil 51b is connected by way of the through hole 60 to a ground (not shown) that is connected in common with the IC 10. Similarly, in the reset signal receiving coil 52, the first spiral coil 52a is connected at one end to a terminal 47a (corresponding to the terminal 47 in FIG. 7) of the IC 10 by way of the through hole 60 and a wiring pattern (partially shown) on the back side surface of the circuit substrate 110. The wiring pattern is indicated by a broken line in the figure. The other end of the coil 52a is connected to one end of the second spiral coil 52b also by way of the through hole 60 and a wiring pattern on the back side of the circuit substrate 110 that is indicated by a broken line in the figure. The other end of the second spiral coil 52b is then connected by way of the through hole 60 to a ground (not shown) that is connected in common with the IC 10. In the IC 10, the logical product of the outputs of the reset signal receiving coils 51 and 52 are input as the reset signal through the NAND gate 70. Further, while the NAND gate 70 is used in this embodiment due to the fact that the circuitry in the IC 10 is negative logic circuitry, an AND gate, naturally, is to be used for positive logic.

The data transmitting/receiving means as mentioned in the claims includes the antenna circuit 6, the reset signal receiving coil includes the reset signal receiving coils 51 and 52 (coil pairs), the AND circuit includes the NAND gate 70, and the circuit section includes the other elements including the IC 10 and the battery.

The operation of the embodiment shown in FIGS. 3 and 4 will now be described. This embodiment is a modification of the embodiment shown in FIGS. 1 and 2. The two independent reset signal receiving coils 51 and 52, each having first and second spiral coils, are disposed on the circuit substrate 110 at positions relatively distant from each other. Similar to the theory described for the foregoing embodiment, it is possible to prevent erroneous reception of a reset signal due to a change in magnetic flux by an alternating magnetic field received over the entire surface of the card. Further, since the logical product of the output signals of the respective reset signal receiving coils 51 and 52 is input as the reset signal by means of the NAND gate 70, it is possible to prevent erroneous reception of a reset signal even if the card receives a localized alternating magnetic field at one location.

If it is desired to legitimately reset the IC 10 in the non-contact type IC card 100a of FIG. 4, only one of the first and second spiral coils in each of the reset signal receiving coils 51 and 52 is respectively subjected to an alternating magnetic field. For example, two coils (not shown) for transmitting a reset signal, each having the same dimensions as each spiral coil, are used. The coils are accurately brought into close proximity to only one coil of the first and second spiral coils of the reset signal receiving coils 51 and 52, respectively, and an alternating current is conducted through them. It is thereby possible to cause an induced electromotive force to occur at each selected spiral coil. Also, for example, a reset signal transmitting coil (not shown) formed by connecting a power supply section to two coils respectively having a structure similar to the two reset signal receiving coils of this embodiment may be used, so that it is brought into close proximity to the reset signal receiving coils 51 and 52 to subject the respective first and second spiral coils to magnetic fields that are opposite in direction from each other.

Naturally, as is apparent from the foregoing description, means for producing magnetic fields of predetermined polarity (direction) at accurate positions is necessary to provide a legitimate reset signal. This fact makes possible the prevention of erroneous reception of a reset signal in normal use.

It should be noted that while the two reset signal receiving coils 51 and 52 are used in the above embodiment, it is also possible to provide three or more reset signal receiving coils and to take the logical product of these outputs as the reset signal.

Figure 5:
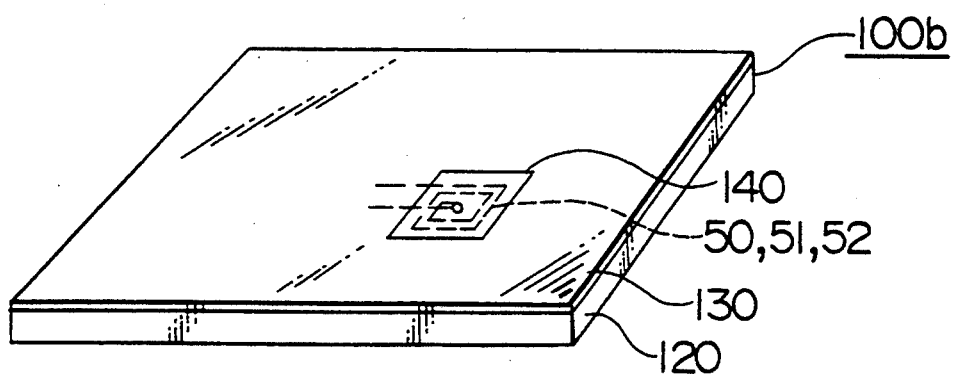
FIG. 5 is a perspective view showing a non-contact type IC card according to a further embodiment of the present invention.
Figure 6:
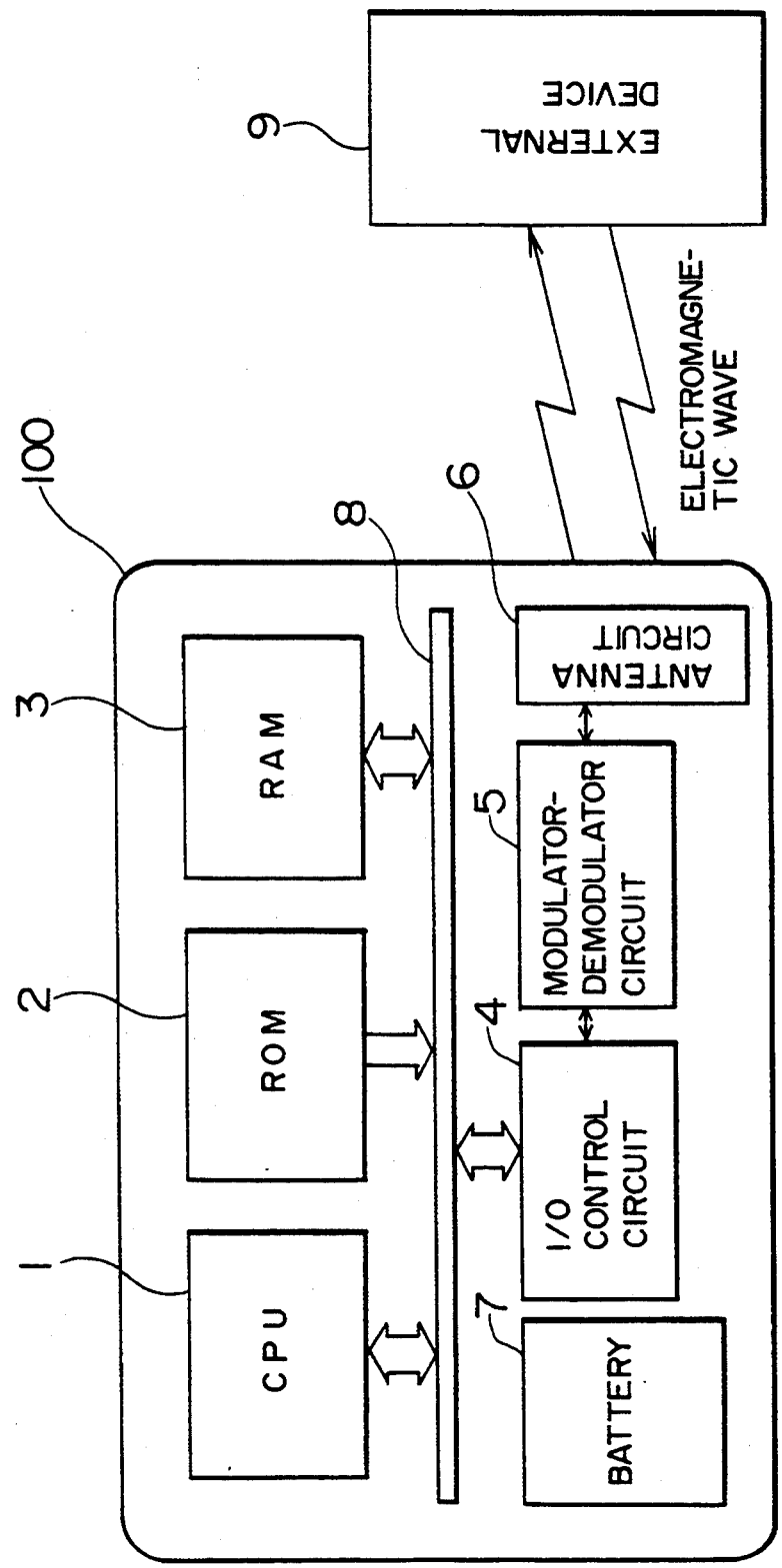
FIG. 6 is a block diagram schematically showing the construction of a non-contact type IC card.
Figure 8:
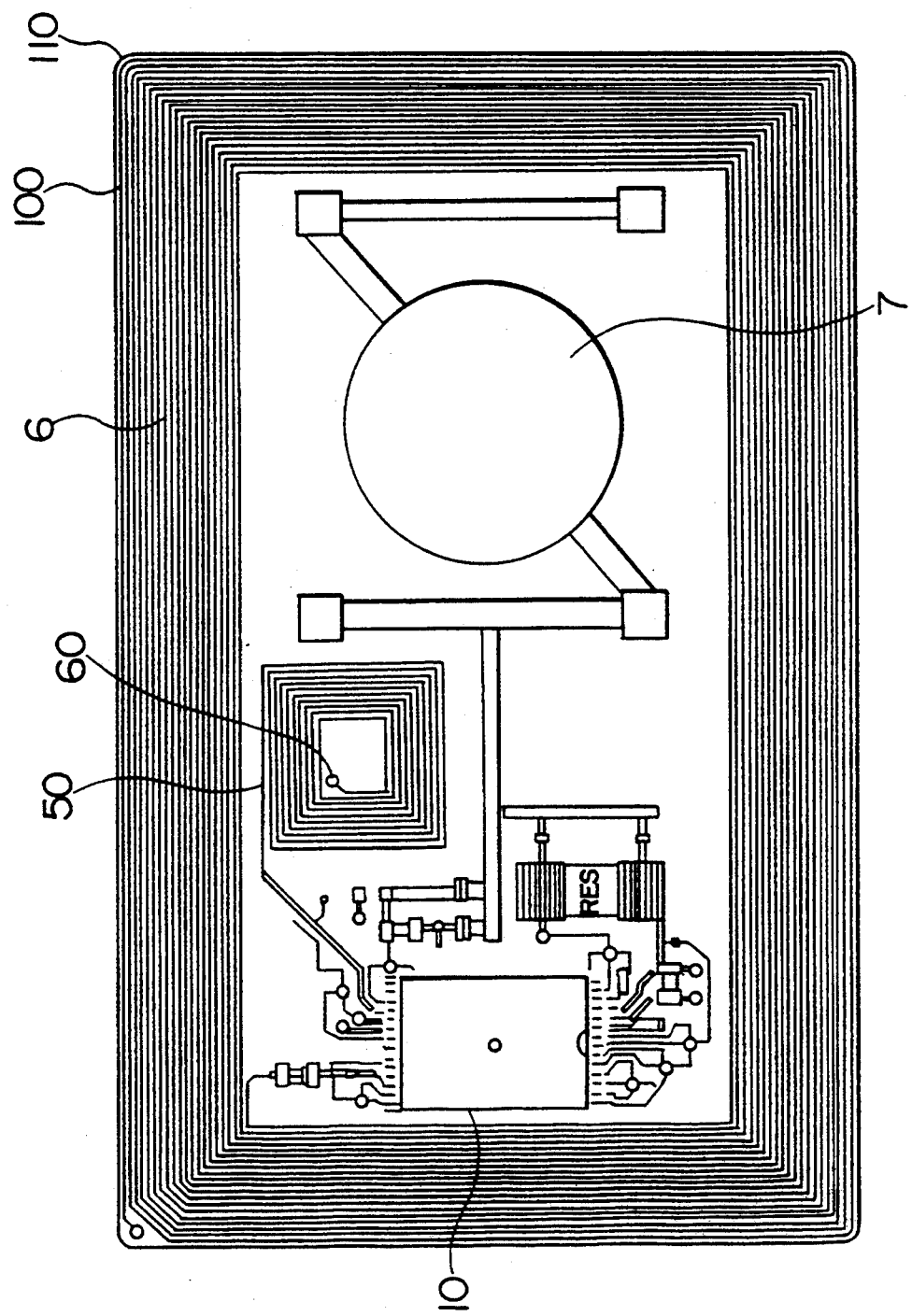
FIG. 8 is a plan view showing the internal structure of a conventional non-contact type IC card.
Figure 9:
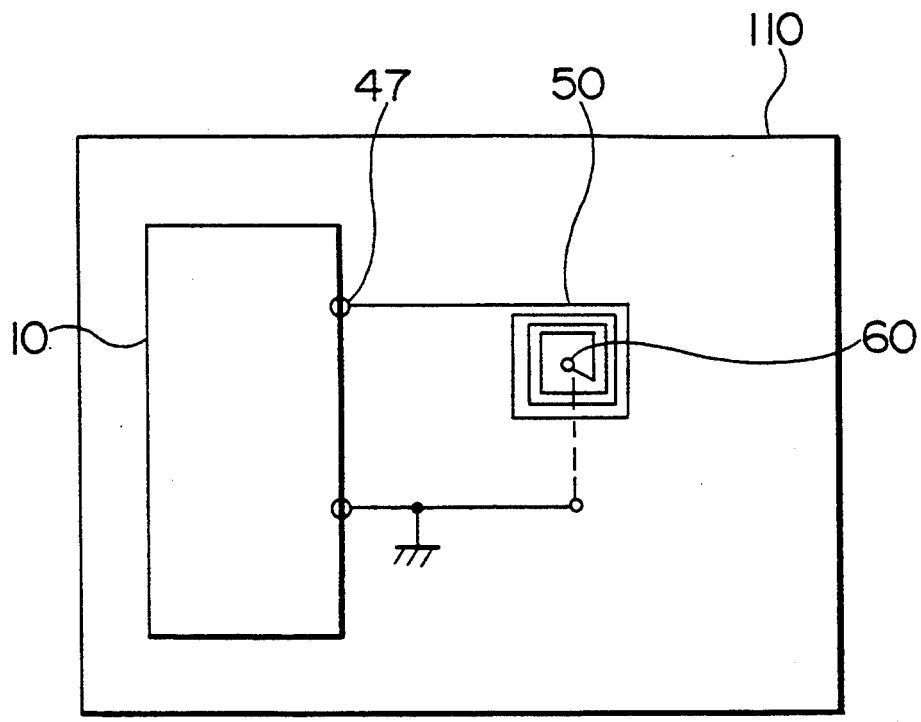
FIG. 9 schematically shows the construction of a reset signal receiving coil in the non-contact type IC card of FIG. 8.

FIG. 5 is a perspective view of a non-contact type IC card according to a further embodiment of the present invention. In this embodiment, a cover sheet 130 of vinyl chloride about 100 μm thick is detachably pasted by means of a tackifier or the like (not shown) to the front side surface of a card body 120 in which a circuit substrate, such as one shown in FIGS. 2, 4, or 8, having the circuit section and coils implemented thereon is sealed. A thin conducting film 140 several microns thick, formed by depositing a conductive metal such as aluminum, is disposed on the surface of the cover sheet 130. The conducting film 140 is formed so that it covers reset signal receiving coils 50, 51, and 52. If there are a plurality of reset signal receiving coils, a conducting film 130 is provided for each coil.

In the case of the non-contact type IC card 100b of FIG. 5, the cover sheet 130 with the conducting film 140 covering the reset signal receiving coils 50, 51, and 52 is pasted onto the card body 120, for example, at the time of shipment of the card from the factory or at the time of delivery after issuing the card. Since, thereby, magnetic flux does not penetrate the reset signal receiving coil even when the card is passed through a magnetic field, the occurrence of an induced electromotive force may be inhibited to prevent an erroneous reset.

While, in the foregoing embodiments, a description has been given with respect to a reset signal receiving coil, the present invention is not so limited. It is also applicable to any coil with a possibility of an erroneous reset.

As has been described, the following advantages may be obtained with the signal receiving coil of the present invention and the non-contact type IC card using the same.

In a signal receiving coil according to the first aspect of the present invention, two spiral coils connected in series are provided close to each other and their winding directions are opposite to each other so that, when subjected to the same alternating magnetic field, they generate induced electromotive forces of substantially the same magnitude and of the opposite directions. Even if an alternating magnetic field is accidentally applied to the signal receiving coil, the electromotive forces generated by the two spiral coils cancel, preventing erroneous operation.

In a signal receiving coil according to the second aspect of the present invention, a plurality of pairs of coils, each pair including first and second spiral coils according to the first aspect of the invention, are provided. Since the logical product of the outputs of the respective coil pairs is taken, the reliability is further improved with respect to the prevention of a failure.

In a non-contact type IC card according to the third aspect of the present invention, the reset signal coil includes a signal receiving coil having the construction according to the first aspect of the invention. It is thus most unlikely to erroneously effect a reset in limited circumstances, such as inspecting the card or restoring operation after the occurrence of an abnormality.

In a non-contact type IC card according to the fourth aspect of the present invention, a plurality of sets of coil pairs according to the second aspect of the invention and an AND circuit to which these pairs are connected in parallel are provided. Thus, reliability is further improved with respect to erroneous reception of a reset signal.

In a non-contact type IC card according to the fifth aspect of the present invention, the portion of the card body corresponding to the reset signal receiving coil is covered with a cover sheet including a conducting film. It is thus possible, as in the foregoing aspects of the invention, to prevent the reset signal coil from being operated due to an alternating magnetic field that is accidentally produced.

What is claimed is:

1. A signal receiving coil for receiving electromagnetic wave signals comprising:
   a plurality of coil pairs, each coil pair comprising:
   a first spiral coil having a predetermined winding direction;
   a second spiral coil in the vicinity of and spaced from said first spiral coil, said second spiral coil being connected in series to the first spiral coil and having a winding direction opposite to the winding direction of said first spiral coil, said second spiral coil generating an induced electromotive force substantially equal in magnitude and opposite in direction from the electromotive force induced in said first spiral coil when said first and second spiral coils are subjected to the same alternating magnetic field; and an AND circuit to which the coil pairs are connected in parallel, said AND circuit producing a logical product of the outputs of the respective coil pairs as a reset signal.

2. A non-contact IC card comprising:

a circuit section;

data transmitting/receiving means connected to said circuit section for transmitting data to and receiving data from another element without contacting the element; and a reset signal receiving coil having a plurality of coil pairs connected to said circuit section, said plurality of coil pairs each comprising:

a first spiral coil having a predetermined winding direction;

a second spiral coil in the vicinity of and spaced from said first spiral coil, said second spiral coil being connected in series to the first spiral coil and having a winding direction opposite to the winding direction of said first spiral coil, said second spiral coil generating an induced electromotive force substantially equal in magnitude and opposite in direction from the electromotive force induced in said first spiral coil when said first and second spiral coils are subjected to the same alternating magnetic field; and an AND circuit connected to said plurality of coil pairs in parallel and producing a logical product of the outputs of the respective coil pairs as a reset signal.

3. A non-contact IC card comprising:

a card body including a circuit section, data transmitting/receiving means for transmitting data to and receiving data from another element without contacting the other element, and at least one reset signal receiving coil for receiving a reset signal for resetting said circuit section, said reset signal receiving coil comprising spiral coil having a predetermined winding direction and a second spiral coil in the vicinity of and spaced from said first spiral coil, said second spiral coil being connected in series to the first spiral coil and having a winding direction opposite to the winding direction of said first spiral coil, said second spiral coil generating an induced electromotive force substantially equal in magnitude and opposite in direction from the electromotive force induced in said first spiral coil when said first and second spiral coils are subjected to the same alternating magnetic field; and a cover sheet detachably attached to said card body including an electrically conducting film for shielding covered portions on said card body from electromagnetic waves, said reset signal receiving coil being covered by said detachable cover sheet.

4. A signal receiving coil for receiving electromagnetic wave signals comprising:

a plurality of coil pairs, each coil pair comprising:

a first spiral coil having a predetermined winding direction;

a second spiral coil in the vicinity of and spaced from said first spiral coil, said second spiral coil being connected in series to the first spiral coil and having a winding direction opposite to the winding direction of said first spiral coil, said second spiral coil generating an induced electromotive force substantially equal in magnitude and opposite in direction from the electromotive force induced in said first spiral coil when said first and second spiral coils are subjected to the same alternating magnetic field; and a NAND circuit to which the coil pairs are connected in parallel, said NAND circuit producing a logical product of the outputs of the respective coil pairs as a reset signal.

5. A non-contact IC card comprising:

a circuit section;

data transmitting/receiving means connected to said circuit section for transmitting data to and receiving data from another element without contacting the element; and a reset signal receiving coil having a plurality of coil pairs connected to said circuit section, said plurality of coil pairs each comprising:

a first spiral coil having a predetermined winding direction;

a second spiral coil in the vicinity of and spaced from said first spiral coil, said second spiral coil being connected in series to the first spiral coil and having a winding direction opposite to the winding direction of said first spiral coil, said second spiral coil generating an induced electromotive force substantially equal in magnitude and opposite in direction from the electromotive force induced in said first spiral coil when said first and second spiral coils are subjected to the same alternating magnetic field; and a NAND circuit connected to said plurality of coil pairs in parallel and producing a logical product of the outputs of the respective coil pairs as a reset signal.

* * * * *